March 17, 1931. W. A. BLUME 1,796,433
FRICTION BRAKE
Filed Nov. 2, 1929 2 Sheets-Sheet 1
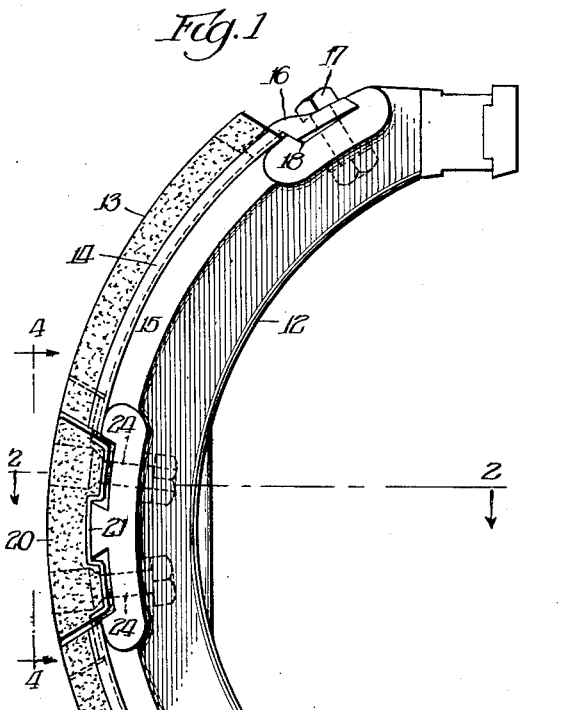
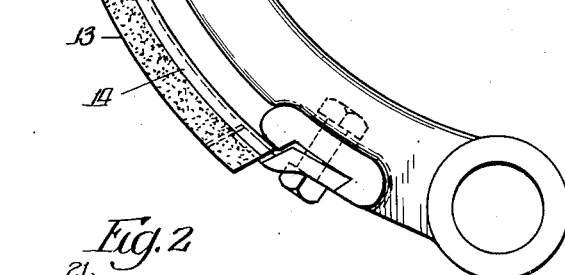
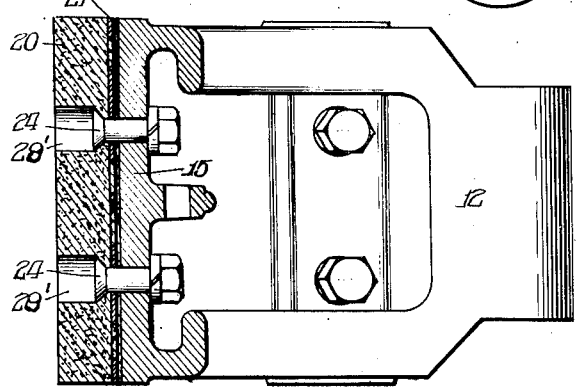
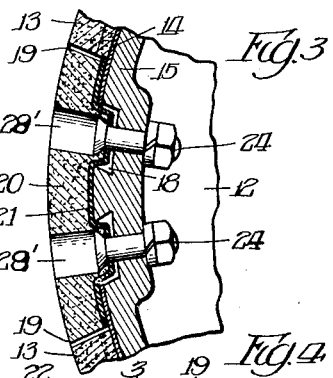
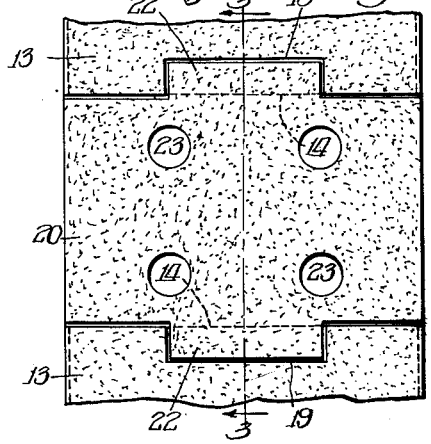
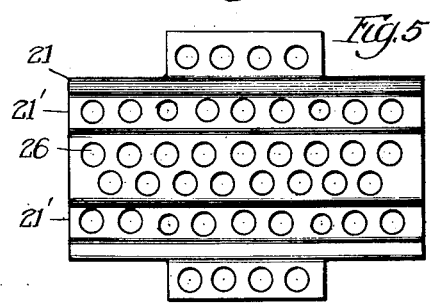
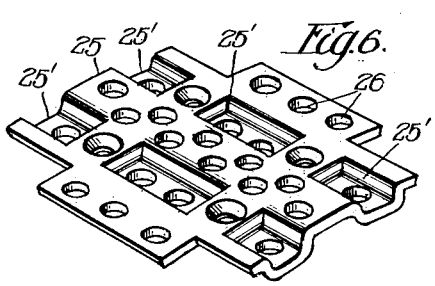

March 17, 1931. W. A. BLUME 1,796,433
FRICTION BRAKE
Filed Nov. 2, 1929 2 Sheets-Sheet 2
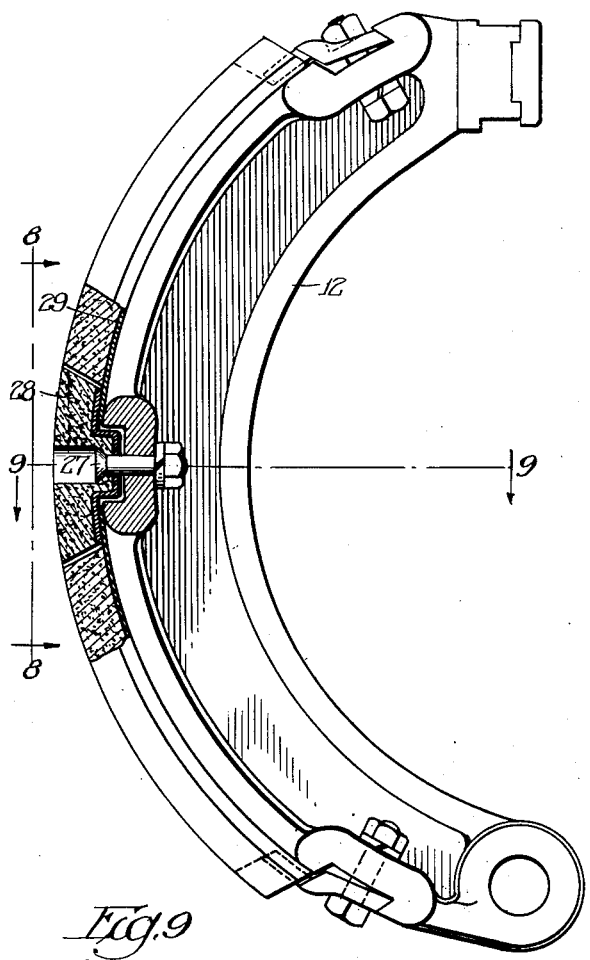
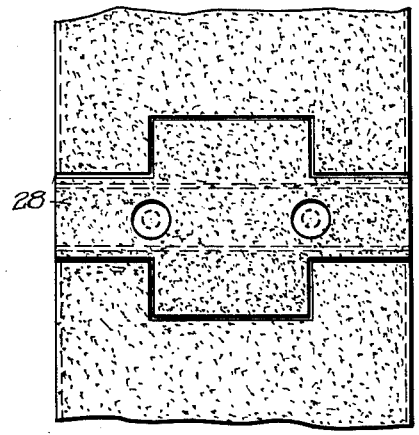
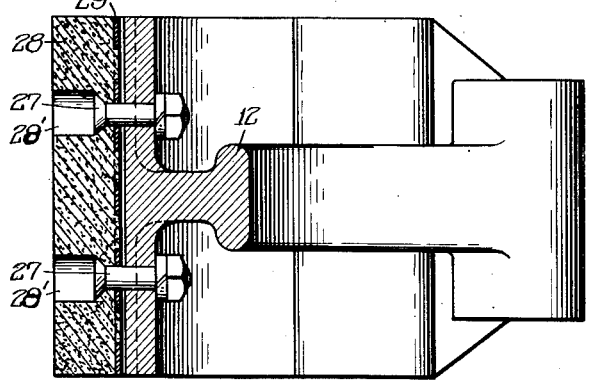
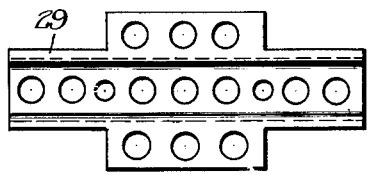
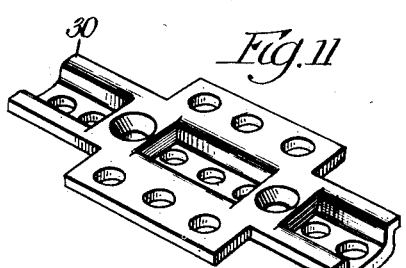

Patented Mar. 17, 1931

1,796,433

UNITED STATES PATENT OFFICE

WILLIAM A. BLUME, OF DETROIT, MICHIGAN, ASSIGNOR TO AMERICAN BRAKE MATERIALS CORPORATION, OF NEW YORK, N. Y., A CORPORATION OF NEW YORK

FRICTION BRAKE

Application filed November 2, 1929. Serial No. 404,273.

This invention relates to friction brakes and has reference more particularly to those in which two or more friction blocks are mounted end to end on a supporting shoe, the blocks being spaced apart to accommodate keeper devices for fastening the blocks to the shoe. The spaced blocks provide a discontinuous friction surface on the shoe and the space between the ends of adjacent blocks may be greater or less depending upon the size of the keeper devices, their arrangement on the shoe, and other conditions.

The object of my present invention is to enlarge the friction surface on the shoe and to make the friction surface substantially continuous by substituting for the usual keepers a keeper friction block which bridges the space between the ends of adjacent blocks and forms a continuation, in effect, between the friction bodies of the blocks.

Another object of the invention is to provide a keeper friction block adapted to take the place of the ordinary keepers for securing the ends of two adjacent blocks to the supporting shoe and forming, in effect, a continuation of the friction surface of said blocks.

And a further object of the invention is to provide a keeper block having a body of composition friction materal embedded thereon and adapted to engage the keeper slots in the supporting shoe and to overlap the ends of adjacent friction blocks and to be fastened rigidly in place against movement lengthwise of the shoe and to hold the friction blocks against endwise movement.

I have illustrated the invention in selected embodiments in the accompanying drawings in which Fig. 1 is in elevation showing the invention applied to a friction brake shoe.

Fig. 2 is a transverse sectional view on the line 2—2 of Fig. 1.

Fig. 3 is an enlarged sectional view on the line 3—3 of Fig. 4.

Fig. 4 is a plan view looking in the direction indicated by line 4—4 of Fig. 1.

Fig. 5 is a plan view of a sheet metal back for the keeper friction block as shown in Figs. 1 to 3.

Fig. 6 is a perspective view of a cast back for a keeper friction block.

Fig. 7 is a view similar to Fig. 1 and partly in section showing a different construction.

Fig. 8 is a plan view looking in the direction indicated by the line 8—8 on Fig. 7.

Fig. 9 is a transverse sectional view on the line 9—9 of Fig. 7.

Fig. 10 is a plan view of a sheet metal back for the keeper friction block shown in Figs. 7–9.

Fig. 11 is a perspective view of a cast back which could be used for the keeper friction block of Figs. 7–9.

Referring first to Figs. 1–6, 12 is a shoe for an internal expanding brake. Two friction blocks each comprising a friction composition body 13 mounted on a suitable back 14 are arranged on the face plate 15 of the shoe and ordinarily they are secured at each end to the shoe by keepers 16 which are fastened to the shoe by bolts 17, the shoe being slotted or grooved at 18 to receive the keepers. The body of each block is recessed at its ends to expose the back 14 and the keeper 16 projects into the recess and engages the back to clamp the back and the block to the shoe. To accommodate the keepers between the adjacent ends of two shoes considerable space is required as indicated in the drawings and my invention provides a keeper friction block comprising a body 20 of composition friction material mounted on a back 21 which substantially fills the space between the adjacent ends of two friction blocks and has at its ends projections 22 adapted to enter the recesses 19 of adjacent blocks and overlap the backs 14 of said blocks at the bottom of said recesses to secure and clamp the ends of the friction blocks to the shoe. The keeper friction block has openings 23 through its body and back to receive bolts 24 which are substituted for the bolts 17 and fasten the keeper friction block to the shoe. The body 20 of the keeper friction block is preferably made of the same composition material as the body 13 of the main friction blocks and the back of the keeper friction block may be stamped out of sheet metal, Fig. 5, or cast metal or any other material or in any suitable shape. There are transverse projections at the back of the keeper friction block which engage the slots 18 in the shoe whereby to assist the bolts 24 in preventing shifting movement of the keeper friction block lengthwise of the shoe. These projections are produced by forming channels 21' in the back, Fig. 5. In the cast back 25, Fig. 6, similar channels 25' are formed. The back for the keeper friction block has a plurality of perforations 26 in which the body is anchored for mounting the body on the back. I prefer to make the keeper friction block of a size slightly less than the space between the ends of adjacent friction blocks so that the keeper friction block will not fit snugly between said ends but will leave a small clearance as indicated in Figs. 1 and 4 to allow for expansion of parts. Figs. 1 to 6 illustrate a keeper friction block to take the place of ordinary keepers which were spaced apart on the shoe and the keeper friction block is relatively large and is secured by two sets of bolts. In Figs. 7 to 11 I have shown a smaller keeper friction block to take the place of a one-piece keeper something like the back shown in Fig. 11. In this construction the keeper friction block is shorter than the ones shown in Figs. 1 to 6, and it is fastened to the shoe by one set of bolts 27. This keeper friction block has a composition friction body 28 and a back 29 made of sheet metal, Fig. 10, or a cast metal back 30, Fig. 11, may be used. In all substantial respects the keeper friction block of Figs. 7 to 11 is used and functions in the manner heretofore described in connection with Figs. 1 to 6. The invention provides a simple and efficient means for enlarging the friction surface of a friction brake assembly, and for making the friction surface substantially continuous. This is accomplished without requiring any changes in the shoe or in the friction blocks or in any other parts since it involves only the substitution of a keeper friction block for the two keepers used at the adjacent ends of two blocks. This change can be made on present installations as well as on new installations. The keeper blocks, like the main friction blocks, are reversible end to end and are interchangeable on different shoes. I may use for fastening the keeper friction block to the shoe the same bolts which were used for fastening the ordinary keepers like the bolts 17; but I prefer to employ flat-headed bolts 24 and 27 because they occupy less room in the counter-sinks 28' and enable greater wear of the body of the keeper friction block. I do not limit the invention to use with the shoes and friction blocks shown in the accompanying drawings but I reserve the right to employ the invention with any shoes and friction blocks and to make such changes as may be necessary or desirable therein to satisfy different conditions within the scope of the following claims.

I claim:

1. In a friction brake, the combination with a shoe and a pair of friction blocks, of a keeper friction block arranged between and forming a substantial continuation of said friction blocks, and means for securing the blocks to the shoe.

2. In a friction brake, the combination with a shoe and a pair of friction blocks, of a keeper friction block bridging the space between the adjacent ends of said pair of friction blocks, and means for fastening said blocks to the shoe.

3. In a friction brake, the combination with a shoe and a pair of friction blocks, of a keeper friction block arranged between and engaging adjacent ends of said pair of friction blocks to clamp them to the shoe, and means for fastening the keeper friction block to the shoe.

4. In a friction brake, the combination with a shoe, and a pair of friction blocks, of a keeper friction block arranged between and overlapping portions of the adjacent ends of said pair of friction blocks, and means for fastening the blocks to the shoe.

5. In a friction brake, the combination with a shoe and a pair of friction blocks arranged end to end and spaced apart, each of said friction blocks comprising a back and a composition body mounted thereon, the body of each opposing end being recessed between its sides and portions of the back forming the bottom of the recesses, of a keeper friction block arranged between said friction blocks and having projections extending into said recesses and engaging the bottoms thereof, and means for fastening the keeper friction block to the shoe.

6. In a friction brake, the combination with a shoe and a pair of friction blocks, of a keeper friction block arranged between and engaging adjacent ends of said pair of friction blocks, said friction blocks and said keeper friction block being each provided with a back and a composition body mounted on the back and the body of the keeper friction block substantially bridging the space between adjacent ends of the bodies of the friction blocks.

7. In a friction brake, the combination with a shoe having a face plate and a transverse slot therein, of a friction block having a transverse projection on its back to engage said slot, and means passing through said projection and the slotted portion of the face plate for fastening the block to the shoe.

8. In a friction brake, the combination with a shoe having a face plate and a transverse slot in said plate, a pair of friction blocks spaced apart on the face plate on opposite sides of said slot, a keeper friction block arranged between and engaging the adjacent ends of said pair of friction blocks, and having a projection on its back entering said slot, and means passing through the keeper friction block at said projection and the face plate at said slot and securing the keeper friction block and the adjacent ends of the pair of friction blocks to the shoe.

9. In a friction brake, the combination with a shoe having a transverse slot, of a friction block having a back and a body mounted on the back, said back being perforated and having a transverse channel therein to receive the body, and means for fastening the keeper friction block to the shoe.

WILLIAM A. BLUME.